US012675431B2

(12) United States Patent
Xiao et al.

(10) Patent No.: US 12,675,431 B2
(45) Date of Patent: Jul. 7, 2026

(54) HYBRID NETWORK-ON-CHIP (NOC) FOR THREAD SYNCHRONIZATION IN MANY-CORE NEURAL NETWORK ACCELERATORS

(71) Applicant: MOFFETT INTERNATIONAL CO., LIMITED, Hong Kong (HK)

(72) Inventors: Zhibin Xiao, Los Altos, CA (US); Xiaoqian Zhang, Los Altos, CA (US)

(73) Assignee: Moffett International Co., Limited, Hong Kong (HK)

( * ) Notice: Subject to any disclaimer, the term of this patent is extended or adjusted under 35 U.S.C. 154(b) by 180 days.

(21) Appl. No.: 18/771,502

(22) Filed: Jul. 12, 2024

(65) Prior Publication Data

US 2026/0017226 A1     Jan. 15, 2026

(51) Int. Cl.
*G06F 15/78*        (2006.01)
(52) U.S. Cl.
CPC ............................... *G06F 15/7814* (2013.01)
(58) Field of Classification Search
CPC .................................................. G06F 15/7814
See application file for complete search history.

(56)                References Cited

U.S. PATENT DOCUMENTS

| | | | |
|---|---|---|---|
| 2010/0217955 A1* | 8/2010 | Conte ...................... | G06T 1/20 |
| | | | 712/E9.002 |
| 2014/0013021 A1* | 1/2014 | Matsumoto ............. | G06F 13/38 |
| | | | 710/267 |
| 2023/0032432 A1* | 2/2023 | Jiang .................... | G06N 3/0464 |
| 2024/0403252 A1* | 12/2024 | Salinas Hernando ...................... | |
| | | | G06F 15/7821 |

* cited by examiner

*Primary Examiner* — Hyun Soo Kim
(74) *Attorney, Agent, or Firm* — Sheppard Mullin Richter & Hampton LLP

(57)                ABSTRACT

This application describes a network-on-chip system that could be used in a hardware accelerator for accelerating neural network computations. An example NoC system may include a plurality of cores, and a plurality of data links connecting adjacent cores of the plurality of cores for transmitting data. The example NoC may further include a global synchronization switch connected to each of the plurality of cores. The global synchronization switch is configured to dynamically connect any pair of cores in the plurality of cores for transmitting control signals between the pair of cores.

18 Claims, 10 Drawing Sheets

300 A hybrid Network-on-Chip (NoC) architecture

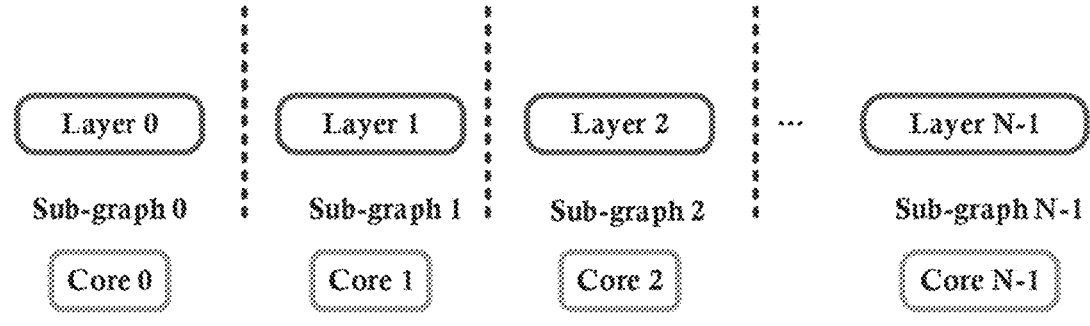
(a) Vertical Model Parallelization
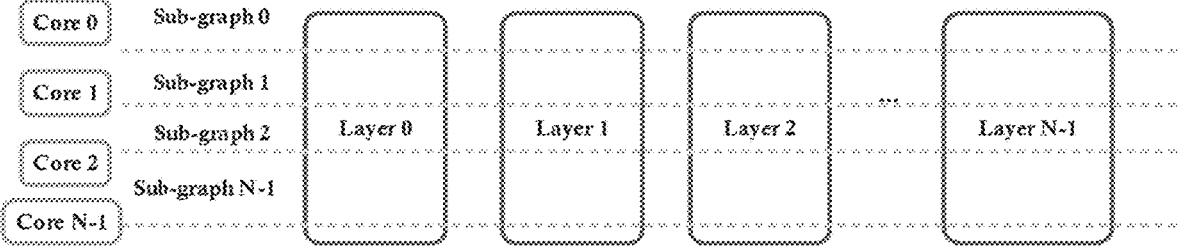
(b) Horizontal Model Parallelization
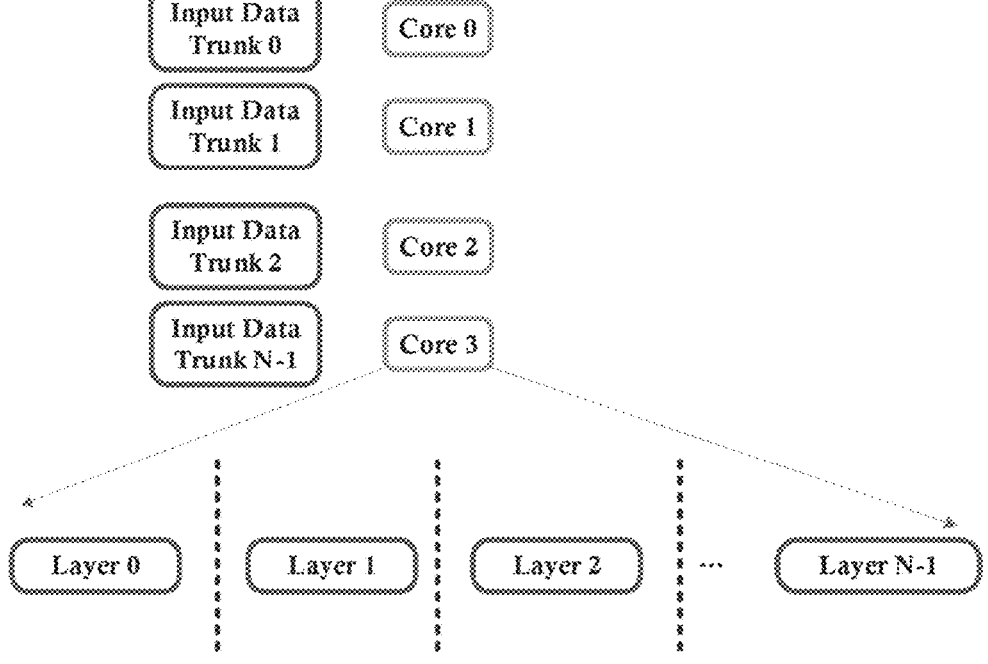
(c) Data Parallelization
*FIG. 2*

Logical view                    401A Horizontal C2C ring 1
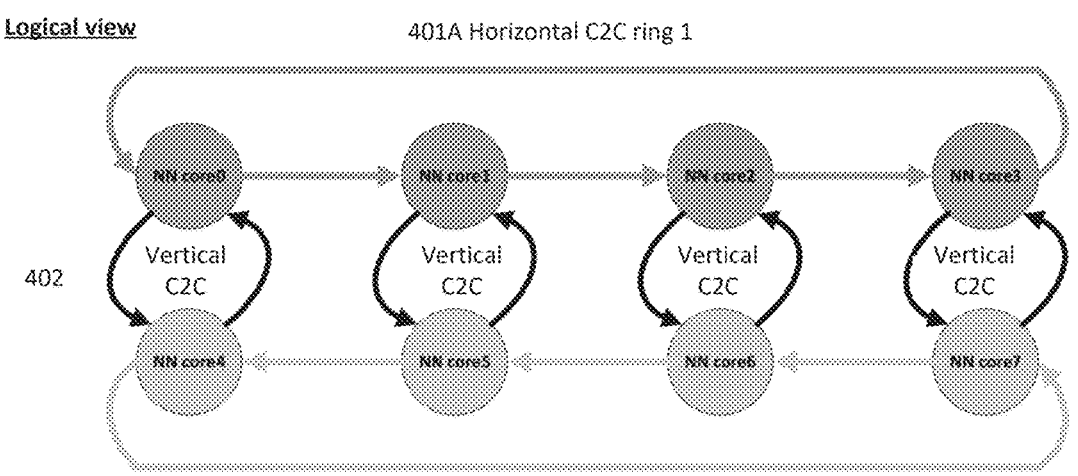
402
401B Horizontal C2C ring 2
System view
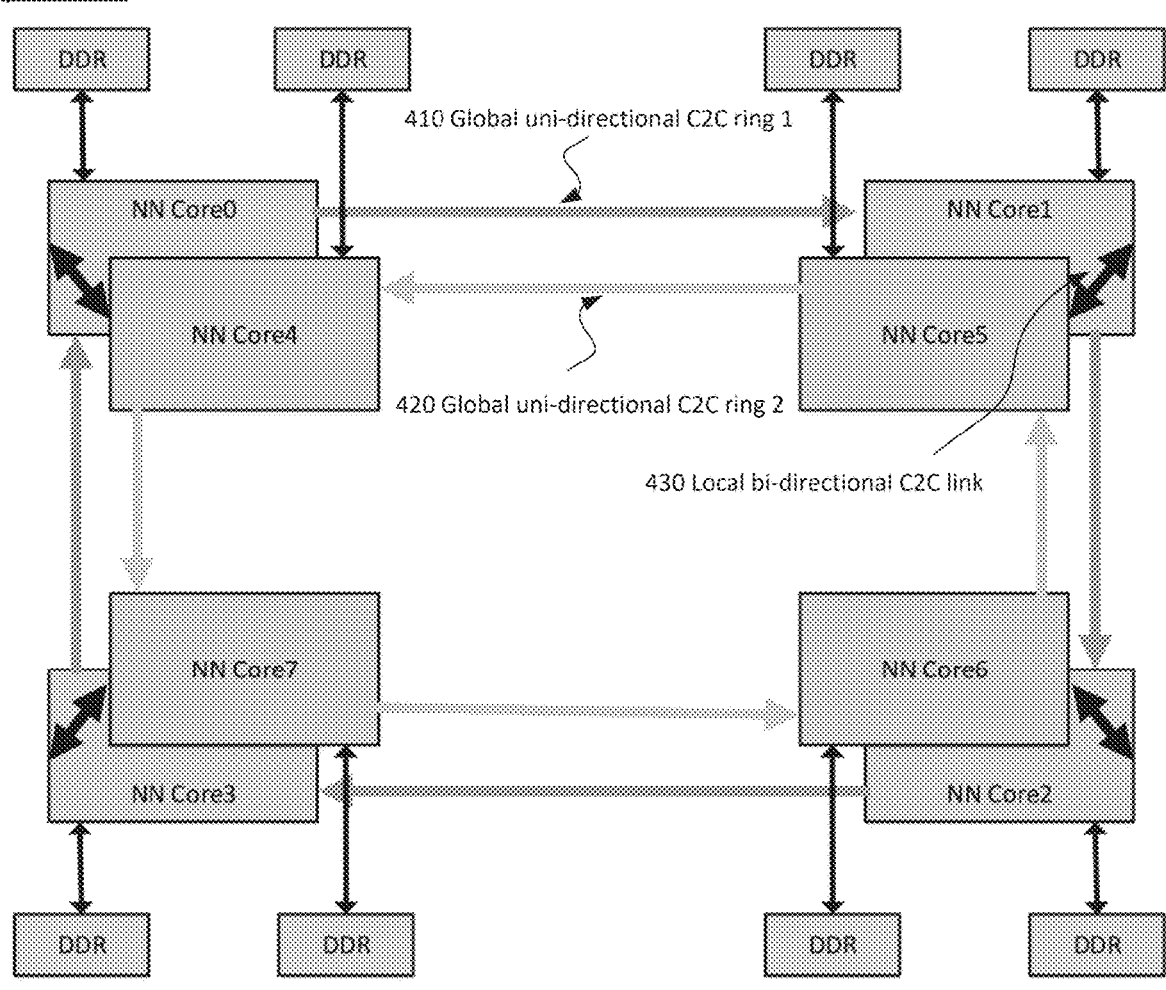
*FIG. 4A*

450 Global sync switch with 8 cores

460 Bitmap in the global sync switch with 8 cores

RID: Receiver ID
SID: Sender ID

Core ID group

462 SID queue
4 bit SID
4 bit SID

Extra-bit is status bit per SID

470 Receiving node action

480 Sending node action

490 Direct link established

Figure 6:
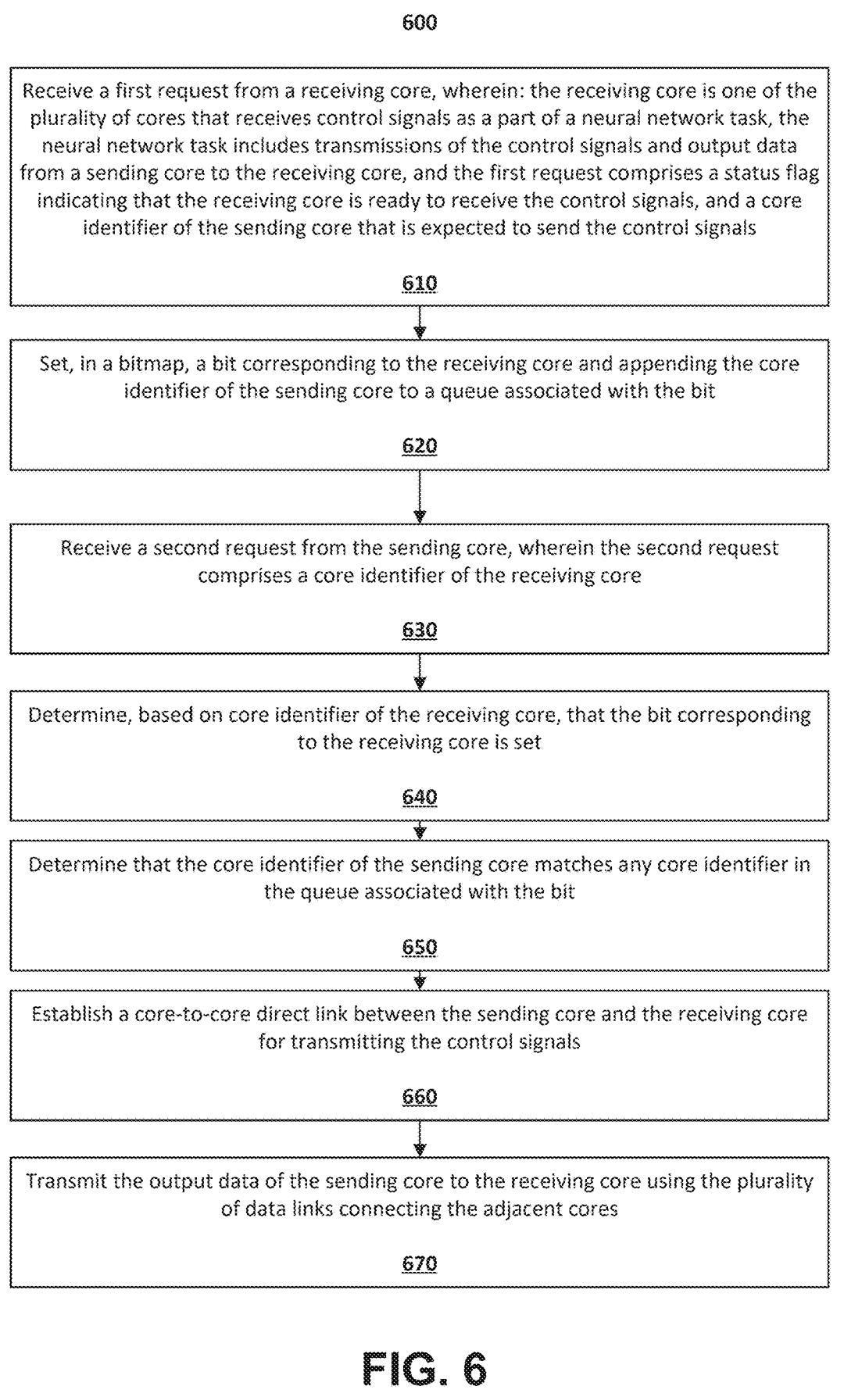

600

Receive a first request from a receiving core, wherein: the receiving core is one of the plurality of cores that receives control signals as a part of a neural network task, the neural network task includes transmissions of the control signals and output data from a sending core to the receiving core, and the first request comprises a status flag indicating that the receiving core is ready to receive the control signals, and a core identifier of the sending core that is expected to send the control signals

610

Set, in a bitmap, a bit corresponding to the receiving core and appending the core identifier of the sending core to a queue associated with the bit

620

Receive a second request from the sending core, wherein the second request comprises a core identifier of the receiving core

630

Determine, based on core identifier of the receiving core, that the bit corresponding to the receiving core is set

640

Determine that the core identifier of the sending core matches any core identifier in the queue associated with the bit

650

Establish a core-to-core direct link between the sending core and the receiving core for transmitting the control signals

660

Transmit the output data of the sending core to the receiving core using the plurality of data links connecting the adjacent cores

700 A hybrid NoC 710 cores

720 Data links

730 Global sync switch

HYBRID NETWORK-ON-CHIP (NOC) FOR THREAD SYNCHRONIZATION IN MANY-CORE NEURAL NETWORK ACCELERATORS

TECHNICAL FIELD

The disclosure generally relates to a hardware design for accelerating end-to-end model execution on a many-core spatial neural network accelerator. In particular, the disclosure describes a Network-on-Chip (NoC) system on a neural network accelerator with decoupled data channels for data exchanges and a global switch for control signal exchanges.

BACKGROUND

Existing Neural Network (NN) accelerators featuring many-core architectures have conventionally been structured with 2D mesh network-on-chip (NoC) designs. These accelerators serve a variety of purposes, with a primary focus on facilitating model weight distribution across multiple cores to enable model parallelism, or the distribution of input data across cores for data parallelism. In both scenarios, the workload on individual cores is typically categorized into three distinct stages: computation, communication, and synchronization. While the computation stage is mostly performed locally within each core, the communication and synchronization stages require both data and control signal exchanges among different cores.

In 2D mesh NoC designs, the data and control signal transmissions generally share the same physical data channels among the cores. This design is clean in terms of wiring, i.e., it is organized and efficient when it comes to the physical wiring layout. However, it has several technical disadvantages such as more complex parsing logic on each node, more complex control signal routing mechanism, congestion on the physical links, among others.

The intricacies of neural network workloads necessitate specialized synchronization methods, particularly when cores are engaged in communication and synchronization tasks. In this disclosure, a novel NoC architecture is described to seamlessly integrate a mesh topology for data transmission and an all-to-all global switch for dynamic allocation of link resources for control signal transmission.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a Network-on-Chip (NoC) may include a plurality of cores. The NoC may also include a plurality of data links connecting adjacent cores of the plurality of cores and configured to transmit data among the adjacent cores. The NoC may furthermore include a global synchronization switch connected to each of the plurality of cores, where the global synchronization switch is configured to dynamically establish a connection between any pair of cores in the plurality of cores for transmitting control signals between the pair of cores. Other embodiments of this aspect include corresponding computer systems, apparatus, and computer programs recorded on one or more computer storage devices, each configured to perform the actions of the methods.

Implementations may include one or more of the following features. In some embodiments, the plurality of cores are arranged, in a logic view, as a matrix, each row of the matrix having a same number of cores; and each row of the plurality of cores are connected in a first uni-directional ring-shape data link and two adjacent first uni-directional ring-shape data links are in opposite directions.

In some embodiments, each column of the plurality of cores are connected in a second uni-directional ring-shape data link and two adjacent second uni-directional ring-shape data links are in opposite directions.

In some embodiments, the plurality of data links each has a higher bandwidth than the connection established by the global synchronization switch.

In some embodiments, the global synchronization switch may include a bitmap with a plurality of bits respectively corresponding to the plurality of cores.

In some embodiments, each bit in the bitmap corresponds to a core and indicates whether the core is ready to receive a control signal.

In some embodiments, each bit in the bitmap corresponds to a receiving core and is associated with a queue, where the queue is configured to store one or more core identifiers associated with one or more sending cores that are expected to send control signals to the receiving core.

In some embodiments, a depth of the queue is configured to store two or more core identifiers such that the global synchronization switch allows both multicast in which two or more sending cores transmit control signals to the receiving core.

In some embodiments, the global synchronization switch is configured to: receive a first request from a receiving core of the plurality of cores, where the first request may include a status flag indicating that the receiving core is ready to receive control signals, and one or more core identifiers of sending cores of the plurality of cores that are expected to send the control signals; set, in a bitmap maintained by the global synchronization switch, a bit corresponding to the receiving core based on the status flag and append the one or more core identifiers to a queue associated with the bit; receive a second request from a sending core of the plurality of cores, where the second request may include an identifier of the receiving core; determine that the identifier of the sending core matches one of the one or more core identifiers in the queue associated with the bit corresponding to the receiving core; and establish a connection between the sending core and the receiving core for the direct core-to-core transmission of control signals.

In some embodiments, the global synchronization switch is further configured to: in response to the identifier of the sending core matching with one of the one or more core identifiers of cores in the queue, send an acknowledge signal (ACK) to the sending core to commence the transmission of control signals.

In some embodiments, the global synchronization switch is further configured to: concurrently with the sending the ACK to the sending core to commence the transmission of the control signals, clear the identifier of the sending core from the queue, thereby allowing the receiving core to schedule a next control signal transmission. Implementations of the described techniques may include hardware, a method or process, or a computer tangible medium.

In one general aspect, a computer-implemented method may include receiving a first request from a receiving core, where: the receiving core is one of the plurality of cores that receives control signals as a part of a neural network task, the neural network task includes transmissions of the control signals and output data from a sending core to the receiving core, and the first request may include a status flag indicating that the receiving core is ready to receive the control signals, and a core identifier of the sending core that is expected to send the control signals.

In some embodiments, the method may also include setting, in a bitmap, a bit corresponding to the receiving core and appending the core identifier of the sending core to a queue associated with the bit. The method may furthermore include receiving a second request from the sending core, where the second request may include a core identifier of the receiving core. The method may in addition include determining, based on core identifier of the receiving core, that the bit corresponding to the receiving core is set. The method may moreover include determining that the core identifier of the sending core matches any core identifier in the queue associated with the bit. The method may also include establishing a core-to-core direct link between the sending core and the receiving core for transmitting the control signals. The method may furthermore include transmitting the output data of the sending core to the receiving core using the plurality of data links connecting the adjacent cores. Other embodiments of this aspect include corresponding computer systems, apparatus, and computer programs recorded on one or more computer storage devices, each configured to perform the actions of the methods.

These and other features of the systems, methods, and non-transitory computer-readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

FIG. 2 illustrates exemplary parallel processing schemes of neural network computations on many-core neural network accelerators, in accordance with various embodiments.

FIG. 4A illustrates a logical view and a system view of the data links (organized as a mesh network) at the core-level NoC in a hardware accelerator, in accordance with various embodiments.

FIG. 6 illustrates an exemplary method of decoupling data and control signal transmissions in a neural network accelerator using a hybrid Network-on-Chip (NoC) architecture, in accordance with various embodiments.

DETAILED DESCRIPTION

Embodiments described herein provide hardware devices and accelerators with a hierarchical Network-on-Chip (NoC) architecture featuring decoupled data channels for data exchanges and a global switch for control signal exchanges.

In the following description, specific, non-limiting embodiments of the present invention will be described with reference to the drawings. Particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope, and contemplation of the present invention as further defined in the appended claims.

Figure 1A:
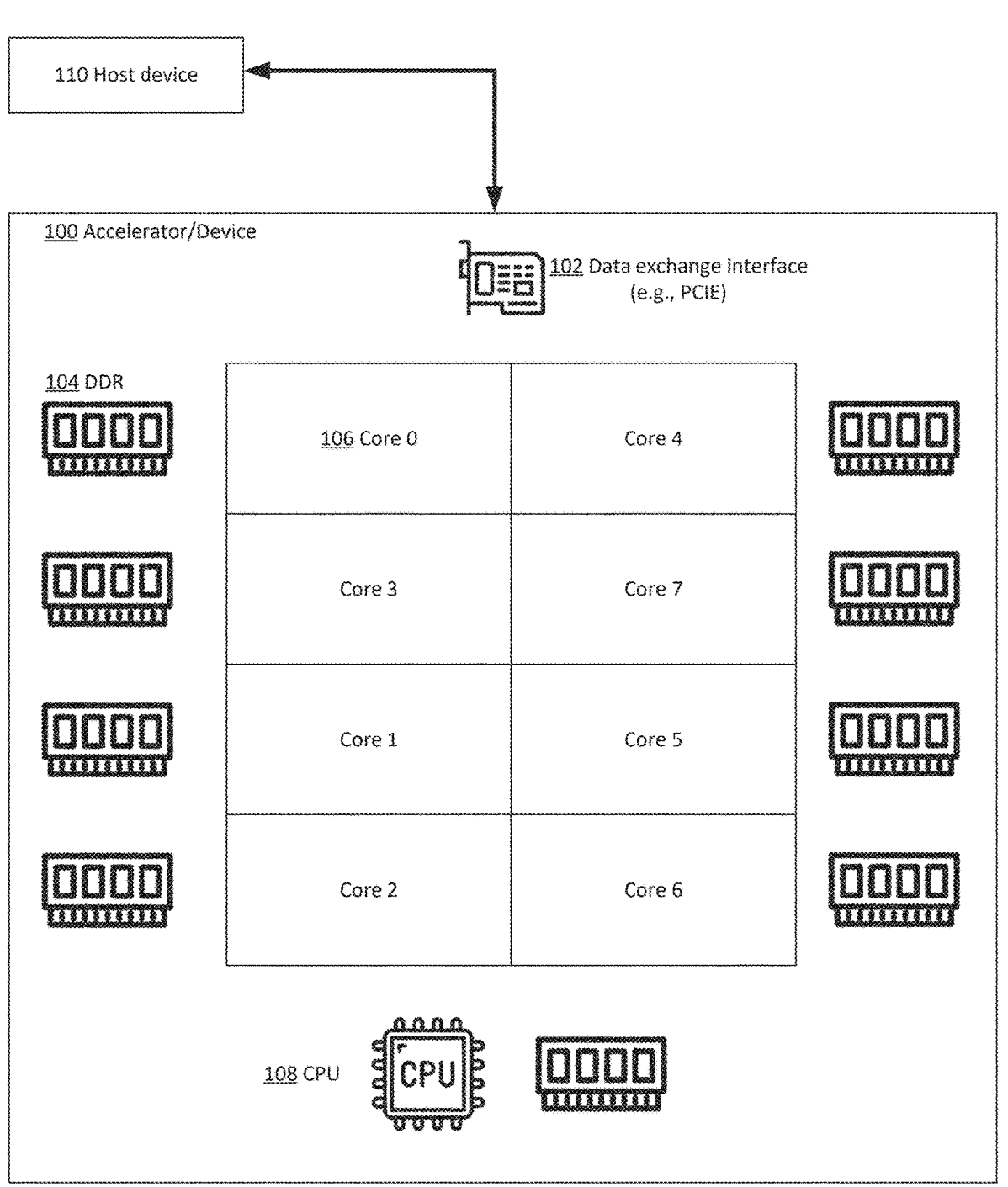
FIG. 1A illustrates an exemplary diagram of a hardware accelerator for neural network computations in accordance with various embodiments.

FIG. 1A illustrates an exemplary diagram of a hardware accelerator 100 for neural network computations in accordance with various embodiments. The accelerator 100 in FIG. 1A is configurable to perform common neural network computations such as convolution computations or vector operations. FIG. 1A illustrates some hardware components in the accelerator 100, such as a plurality of neural network (NN) cores 106 (FIG. 1A illustrates 8 NN cores), a processing unit 108 (FIG. 1A illustrates a CPU as an example, which may be replaced with another type of processor), memories (e.g., Double Data Rate (DDRs)), a data exchange interface connecting the accelerator 100 with a host device 110. Depending on the implementation, the accelerator 100 may include additional components such as data pre-processing circuit and post-processing circuit to perform parts of the neural network computations.

In a typical setup, the host device 110, such as a computer or a mobile device, runs a neural network software and orchestras the overall computation process, while the accelerator 100, such as a specialized hardware device implemented as an Application-Specific Integrated Circuit (ASIC) or a Field-Programmable Gate Array (FPGA), helps to accelerate the computation of the neural network by performing complex mathematical operations at a much faster rate than the host device. In some embodiments, the data exchange between the host device 110 and the accelerator 100 may be through a Peripheral Component Interconnect Express (PCIe) 102.

Figure 1B:
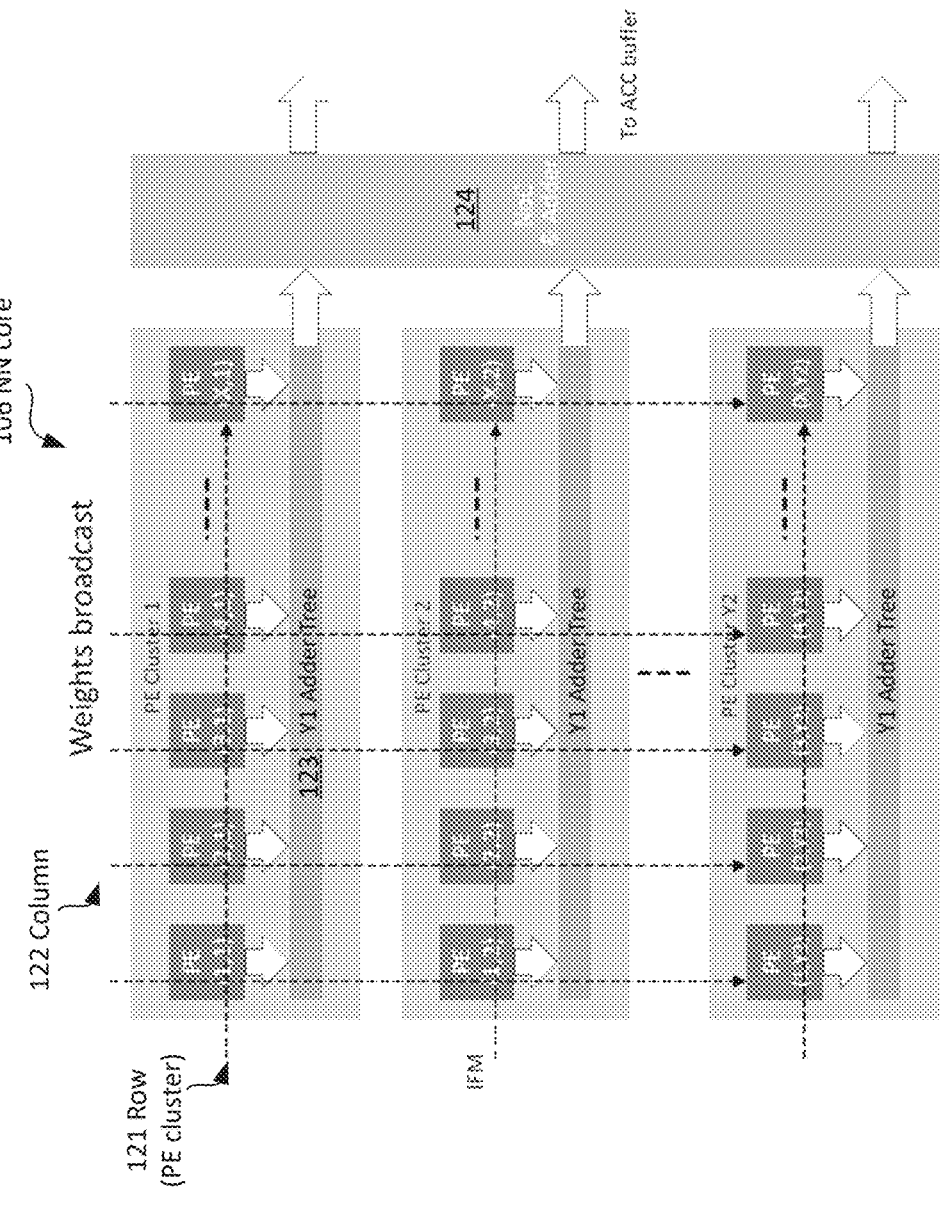
FIG. 1B illustrates an exemplary architecture of an NN core in accordance with various embodiments.

In some embodiments, each of the NN cores 106 in the accelerator 100 may include a plurality of processing entities (PEs) arranged in clusters. Referring to FIG. 1B for an exemplary architecture of an NN core 106. Note the arrangement of the PEs in the NN core 106 in FIG. 1B is for illustrative purposes and may be implemented in other ways depending on the use case.

As shown on the left portion of FIG. 1B, the NN core 106 may include a matrix of PEs. Each PE may include a plurality of multipliers (MUL gates). The multipliers within each PE may work in parallel, and the PEs within the NN core 106 may work in parallel. In FIG. 1B, the number of columns 122 of PEs in the NN core 106 is denoted as X, the number of rows 121 of PEs in the NN core 106 is denoted as Y2, and the number of multipliers within each PE is denoted as Y1. Each row 121 of PEs may be referred to as a PE cluster, and each PE cluster may be coupled to Y1 Adder-trees 123 for aggregating the partial sums generated by the multipliers within the PE cluster. The aggregation results from the Adder-trees 123 across all PE clusters (total Y1×Y2 Adder-trees) may be fed into an Adder 124 for aggregation. The adder 124 may refer to a digital circuit performing the addition of numbers.

Referring back to FIG. 1A, the data movement during neural network computations in the accelerator 100 may occur at three levels.

At the highest level, the host device 110 may send data to the accelerator 100 and obtain certain outputs from the accelerator 100. The data from the host device 110 may be stored in the DDRs 104 (or other types of memories) coupled to the NN cores, and the accelerator 100 may retrieve data from the DDRs 104 and return them to the host device 110.

At the intermediate level, the plurality of NN cores 106 may need to exchange data as part of the computations. For instance, when a neural network processes a large image (e.g., an 8K image), the data (e.g., pixels) is too large to fit in any local DDRs of the NN cores. A common way is to segment the image into small pieces and distribute them among the local DDRs of the NN cores for parallel processing. During the subsequent matrix operations (e.g., convolutions), all weights may be needed for the computation, and thus each core may need to cast (e.g., broadcast, multicast, or unicast) its local data to some other cores.

At the lowest/most inner level, the plurality of PE clusters within each NN core may exchange data. For example, when performing convolution operations using a large filter matrix (e.g., 3*3 or 5*5) and a smaller stride, multiple adjacent PE clusters may have overlapping data to process. In these cases, one PE cluster may multicast its data to its adjacent PE clusters.

As pointed out in the background section, the existing NoC architecture generally arranges the cores (e.g., the eight cores in FIG. 1A) as a mesh network, in which each core is connected to its nearest adjacent cores. If one core needs to exchange data or control signals with a remote core (without direct links), it needs to send the data package (data and/or control signals), based on its routing logic, to one of its adjacent core to forward the data package to the remote core. Both the data and the control signals share the same link (or channel) between the adjacent cores. Here, "data" in the context of neural network computation may include input data samples, feature vectors, activation values, weight parameters, gradients, loss functions, and output predictions generated during the forward and backward passes of the neural network computations, etc. The "control signal" may include synchronization signals to coordinate the timing of computations, interrupt signals to signal exceptional events or conditions, flow control signals to regulate data transfer rates, reset signals to initialize system state, and arbitration signals to resolve conflicts in accessing shared resources, etc.

This mesh-topology-based architecture simplifies the physical layout and organization of the wiring compared to other topologies. It creates a clean and structured network of connections between cores, which can be visually appealing and easy to understand from a design perspective. However, the disadvantages of mesh-topology-based architectures are also obvious. Comingling both data and control signals on the same transmission links may cause delayed receipts of the relatively light-weight control signals causing higher synchronization latency, congestions on the links, more complex programming primitives since the programmers need to care about the timing and order of data and control signal transmission, etc.

The subsequent discussion outlines the design of a core-level hybrid NoC architecture aimed at resolving the aforementioned issues. This architecture introduces a global synchronization switch to separate control signal communication from data communication. The global synchronization switch is programmed to establish direct core-to-core connections dynamically, employing sender/receiver primitives, between every pair of cores to facilitate instantaneous control signal exchange. Meanwhile, the data links among the cores retain the mesh-topology architecture for structured wiring. This configuration enables out-of-order computation for enhanced performance, offers programmer-friendly interfaces by allowing programmers to disregard the timing of sender/receiver primitives, and mitigates congestion on the transmission links.

FIG. 2 illustrates exemplary parallel processing schemes of neural network computations on many-core neural network accelerators, in accordance with various embodiments.

The first scheme is vertical model parallelization. Under this scheme, a multi-layer neural network may be vertically divided and distributed to multiple cores by layers, each core processing a sub-graph corresponding to one of the layers in the neural network.

The second scheme is horizontal model parallelization. Under this scheme, the multiple layers of the neural network are divided horizontally and distributed to multiple cores, each core processing a sub-graph corresponding to a portion of each layer in the multiple layers.

The third scheme is data parallelization. Different from the previous two schemes where the models are divided and distributed, data parallelization involves dividing the input data into trunks, and each core processes one trunk through the multiple layers of the neural network.

Under any of these schemes, running the neural network computations on the multi-core system involves breaking down the workload on each core into three distinct stages: computation, communication, and synchronization.

During the compute stage, the multiple cores simultaneously work on the same neural network task, with each core assigned a specific sub-task. This stage involves executing various operations and algorithms to process the input data and generate the desired outputs.

In the communication and synchronization stages, cores require data exchange or operational synchronization. For example, during certain computation phases, the results generated by each core may necessitate consolidation or reduction into a unified outcome. Alternatively, one core's sub-task result might rely on another core's sub-task result to progress to the subsequent sub-task. Such data dependencies mandate exchanges of data and control signals among the cores. The efficiency of these exchanges directly influences the speed and efficiency of the neural network computation process.

Figure 3:
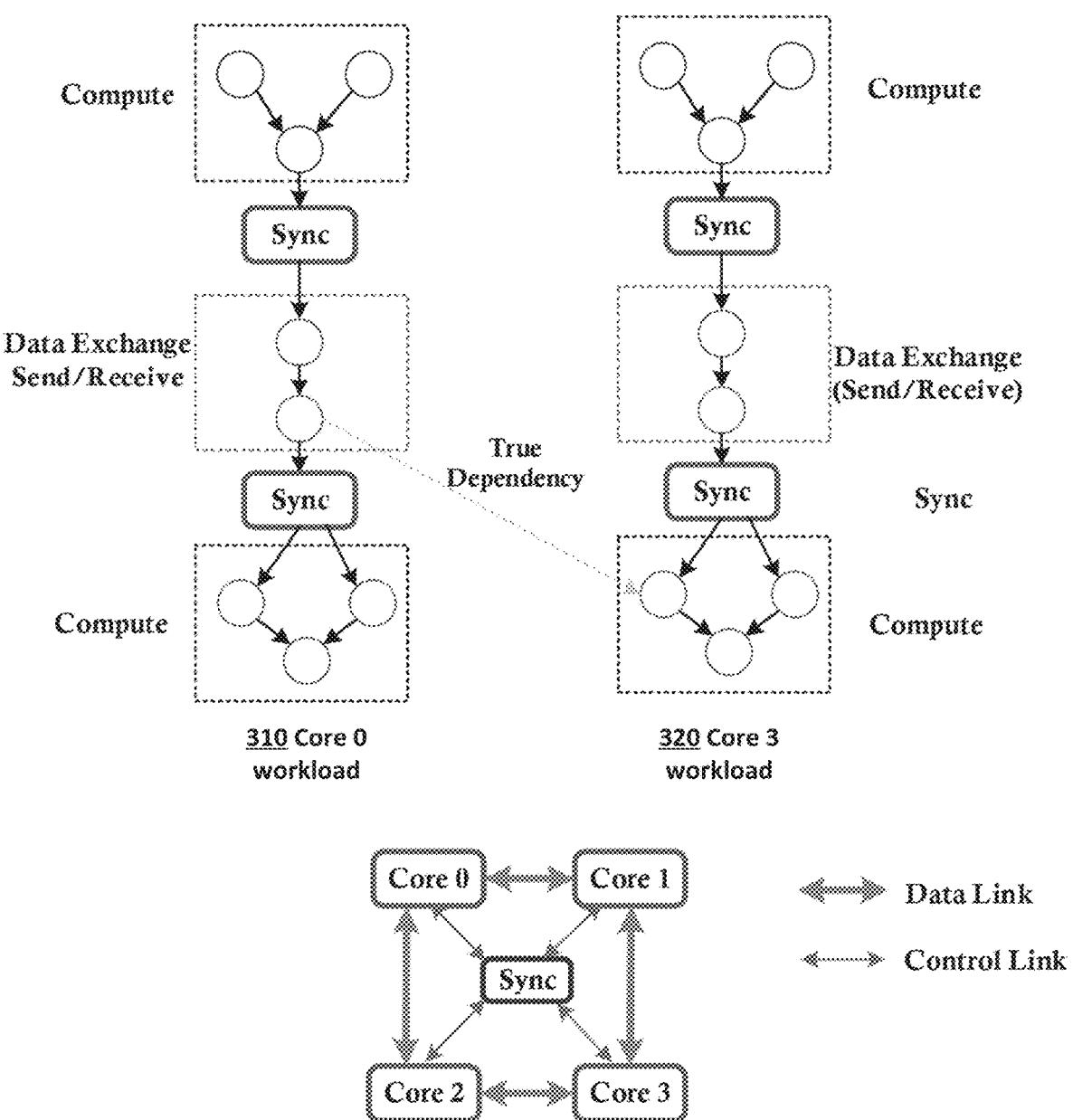
FIG. 3 illustrates an example hybrid Network-on-Chip (NoC) architecture for thread synchronization among cores, in accordance with various embodiments.

FIG. 3 illustrates an example hybrid Network-on-Chip (NoC) architecture 300 for thread synchronization among cores, in accordance with various embodiments. The hybrid NoC 300 in FIG. 3 uses four cores as an example. Depending on the implementation, the NoC 300 may include a larger number of cores.

In hybrid NoC 300, the four cores are connected as a mesh network using data links, in which each core is connected to its nearest adjacent core. In addition, the four cores are also connected to a global synchronization switch in an all-to-all network. The global synchronization switch may establish a direct control link (for transmitting control signals) between any pair of cores.

The simple example in FIG. 3 illustrates how the hybrid NoC 300 works. In this example, the workload 310 on core 0 involves computation stage, followed by a synchronization and data exchange with the core 3 running workload 320. That is, core 0 may need the intermedia results from core 3 to continue its local sub-task. Similarly, core 3 may need intermedia results from another core to continue its local sub-task. In some embodiments, core 0 may send a control signal to core 3 to request for the needed intermedia results. In other embodiments, core 3 may send a control signal to core 0 to request a permission to send the intermedia results. In either case, the control signal exchange between core 0 and core 3 may go through the global synchronization switch through a direct control link for fast transmission. On the other hand, the actual data transmission from core 3 to core 0 may go through the mesh topology through the data links, i.e., core 3 needs to send the intermedia results to its nearest neighbor core 1 or core 2 first (depending on core 3's routing policy), which then forwards the intermedia results to core 0.

In some embodiments, each of the datalinks in the mesh network has a higher bandwidth than the core-to-core connection established by the global synchronization switch for transmitting control signals.

FIG. 4A illustrates a logical view and a system view of the data links (organized as a mesh network) at the core-level NoC in a hardware accelerator, in accordance with various embodiments. The exemplary data links at the core-level NoC in FIG. 4A include 8 NN cores that are grouped into two groups of 4 cores and arranged in two rows and four columns.

In the logical view in FIG. 4A, the NN cores 0~3 in the row direction are connected with a horizontal C2C (core to core) ring 1 401A (e.g., the first uni-directional ring-shape data link) and the NN cores 4~7 in the row direction are connected with another horizontal C2C (core to core) ring 2 401B. Note that ring 1 401A and ring 2 401B are in opposite directions.

In the column direction of the NoC in FIG. 4A, each column includes two NN cores (e.g., core 0 and core 4 in the first column) that are connected with a vertical C2C ring 402. Since there are only two NN cores in each vertical C2C ring and each core has one input link and an output link, the "two adjacent rings having opposite directions" requirement is met by the vertical rings, but they may appear as bi-directional C2C links 402 in FIG. 4A.

In the system view of the exemplary 4×2 core-level NoC in FIG. 4A, the cores 0-3 are connected by the uni-directional core-to-core (C2C) ring 410 (the clockwise ring), and cores 4-7 are connected by the uni-directional C2C ring 420 (the counter-clockwise ring). The cores 0-3 respectively correspond to cores 4-7, and each pair of the corresponding cores (e.g., core 1 and core 5) are connected with a bi-directional C2C link 430. The DDRs in FIG. 4A may be Double Data Rate memory, a type of dynamic random-access memory (DRAM) that is commonly used in computers, laptops, and other electronic devices for temporary data storage.

Figure 4B:
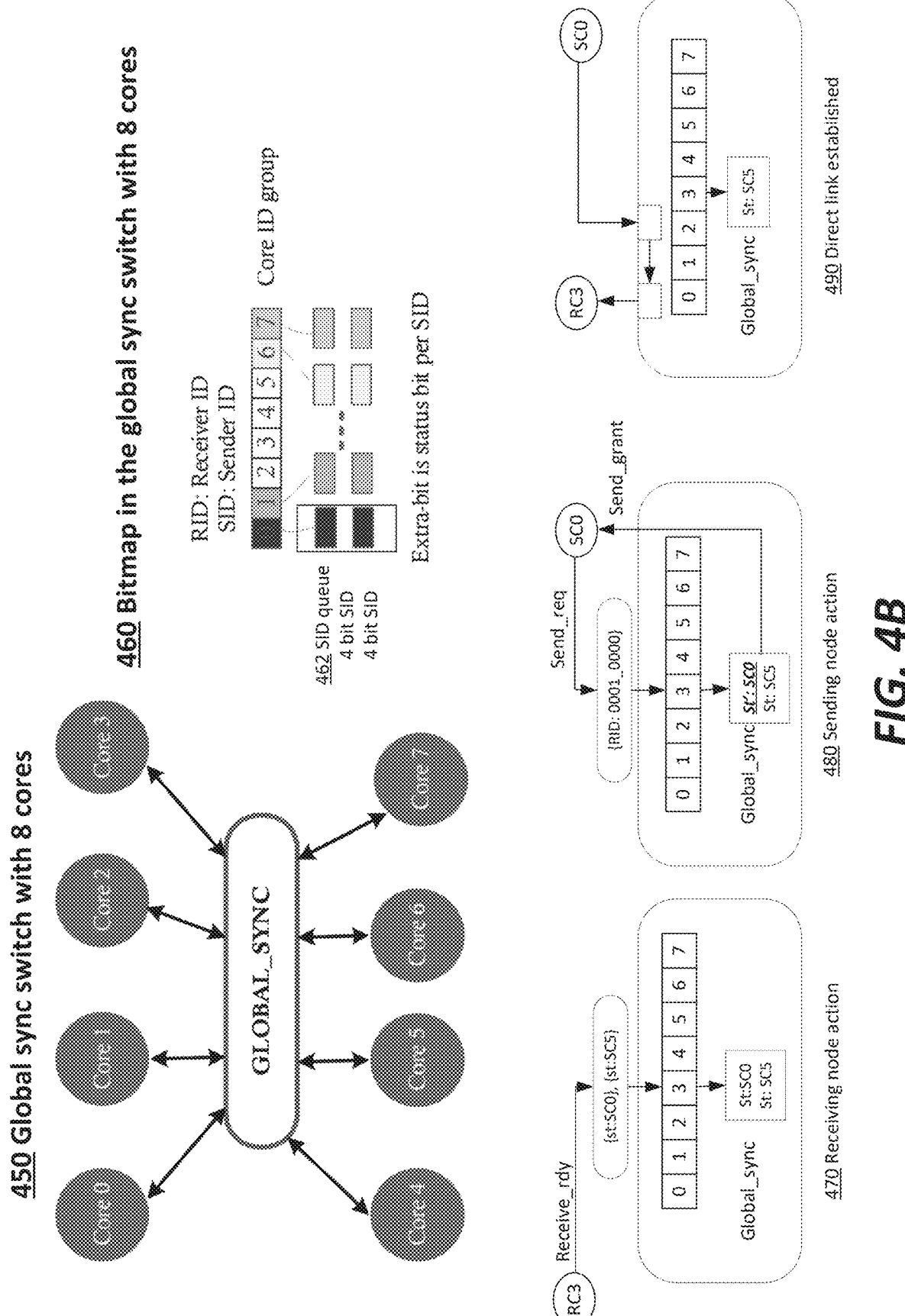
FIG. 4B illustrates an all-to-all interconnection of the control links through a global synchronization switch at the core-level NoC in a hardware accelerator, in accordance with various embodiments.

FIG. 4B illustrates an all-to-all interconnection of the control links through a global synchronization switch 450 at the core-level NoC in a hardware accelerator, in accordance with various embodiments. Different from the four-core example in FIG. 4A, FIG. 4B uses an eight-core example to illustrate the control signal exchange using the all-to-all global synchronization switch 450.

As shown in FIG. 4B, each of the eight cores (core 0~7) is connected to the global synchronization switch 450 (denoted as GLOBAL SYNC in FIG. 4B). The global synchronization switch 450 is configured to dynamically setup a core-to-core connection, i.e., a direct link, between any pair of the cores for direct transmission of control signals.

In some embodiments, the global synchronization switch 450 maintains a bitmap 460, each bit in the bitmap 460 corresponds to one of the cores acting as a receiving core that receives control signals. Each bit in the bitmap 460 is also associated with a queue 462. The queue 462 stores core identifiers of the cores sending the control signals (denoted as sending cores) to the receiving core.

In some embodiments, the depth of the queue 462 for each bit in the bitmap 460 determines whether the corresponding core supports unicast or multicast. When the depth of the queue 462 is one, the corresponding core only supports unicast. When the depth of the queue 462 is greater than one, the corresponding core supports multicast. In some embodiments, each bit in the bitmap has a queue depth of two, thereby supporting two cores to send control signals to the receiving core simultaneously.

In some embodiments, the receiving core ID is represented using multi-hot encoding, e.g., using the same number of bits as the bitmap with one or more bits being set. For instance, 8'b0010_0000 represents core 2 because the second bit in the 8-bit bitmap is set to 1, 8'b0010_1000 represents both core 2 and core 4 because the second and fourth bits in the 8-bit bitmap are set to 1. This way of encoding the identifiers of the receiving cores simplifies the parsing of the identifiers, thereby accelerating the lookup of the corresponding receiving core in the bitmap 460 (i.e., time complexity if O(1)). More importantly, this encoding method allows a sending core to send to multiple receiving core using one single request (e.g., by sending a request with 8'b0010_1000 to indicate that the control signals will be sent to both core 2 and core 4). In other words, this multi-hot encoding method allows a sending core to send control signals to multiple receiving cores. In combination with the multi-entry queue structure 462 that allows one receiving core to receive control signals from multiple sending cores, the GLOBAL_SYNC allows many-to-many direct links among cores.

In some embodiments, the identifiers of the sending cores (denoted as sender ID in FIG. 4B) are represented using binary encoding to minimize the storage footprint. That is, N cores (where N is greater than 1) will need $log_2(N)$ number of bits. For instance, 8 cores in FIG. 4B may use 3 bits to represent the identifiers of the sending cores (e.g., 3'b100 represents core 7). In some embodiments, the sending core ID in the queue 462 also includes a status bit indicating the corresponding receiving core is ready to accept control signals from the sending core. For instance, in the 8-core switch 450 example in FIG. 4B, each entry in the queue 462 includes 4 bits (1 status bit of the receiving core, and 3 bits of the sending core ID). This way of encoding of the sending core IDs allows the GLOBAL_SYNC to minimize the valuable storage/memory space on the NoC.

FIG. 4B further illustrates an exemplary process of dynamically setting up a direct core-to-core control link using the bitmap 460 and the queues 462. For instance, core 3 in this case is a receiving core (denoted as RC3 in FIG. 4B), and the sub-graph computation on core 3 has a true dependency on the intermedia data from core 0 and core 5 (denoted as SC0 (sending core 0) and SC5 (sending core 5) in FIG. 4B). In this case, core 3 may send a Receive_rdy (e.g., Receive Ready) command to the GLOBAL_SYNC in action 470, which includes a first 4-bits {st:SC0} (where "st" represents 1-bit status indicating "ready to receive", and "SC0" represents 3-bits of core ID for core 0) and a second 4-bits {st:SC5}. After receiving the Receive_rdy command, the GLOBAL_SYNC adds {st:SC0} and {st:SC5} to the queue of the bit in the bitmap 460 that corresponds to core 3.

Subsequently, core 0 may send a Send_req command to the GLOBAL_SYNC at action 480. This Send_req may include the multi-hot encoding of the receiving core ID, i.e., 8'b0001_0000 representing core 3, indicating core 0 is requesting permission to send control signals to core 0.

After receiving the Send_req command, the GLOBAL_SYNC may check the core 3's queue to determine whether there is any entry matching core 0's ID. If the determination is positive, the GLOBAL_SYNC may send a Send_grant (an ACK signal) to core 0 to commence the transmission of the control signals.

At step 490, the GLOBAL_SYNC may dynamically establish a connection, e.g., a direct link, between core 0 and core 3 for core-to-core transmission of the control signals. Core 0 may use this direct link to transmit the control signals to core 3 without waiting for the corresponding data transmission from core 0 to core 3 through the mesh network illustrated in FIG. 4A.

In some embodiments, once the direct link between the sending core and the receiving core is established, the GLOBAL_SYNC may remove the corresponding entry from the queue so that the receiving core schedule the next control signal transmission.

In this design, the transmission of control signal does not need to wait for the commencement of corresponding data transmission. In fact, the transmission of the control signals and the data are decoupled and parallelized, allowing flexibility in the order of operations. For instance, out-of-order computation may be implemented using this hybrid NoC architecture for higher performance.

For instance, using this hybrid NoC architecture, a receiving core can simultaneously receive control signals from multiple sending cores through the direct control signal links, i.e., multi-casting. This allows the receiving core to receive control signals before receiving the actual data, enabling it to organize out-of-order computations based on these signals. Upon receiving control signals from two sending cores, the receiving core can determine that computations involving data from both cores can be performed in parallel or out of order. Consequently, the receiving core can initiate computations as soon as data arrives from any of the sending cores (i.e., out-of-order computation).

In contrast, in a traditional mesh-only NoC architecture, the receiving core receives both the first control signal and the first data from the first sending core, followed by the second control signal and data from the second sending core. Without direct control signal connections, control signals reach the receiving core much slower compared to using the all-to-all connections in the GLOBAL_SYNC. Furthermore, until both control signals from the sending cores are received, the receiving core may not ascertain whether out-of-order computations are permissible, necessitating it to wait for the arrival of both signals. This waiting process significantly slows down computation compared to the hybrid NoC architecture.

Figure 5:
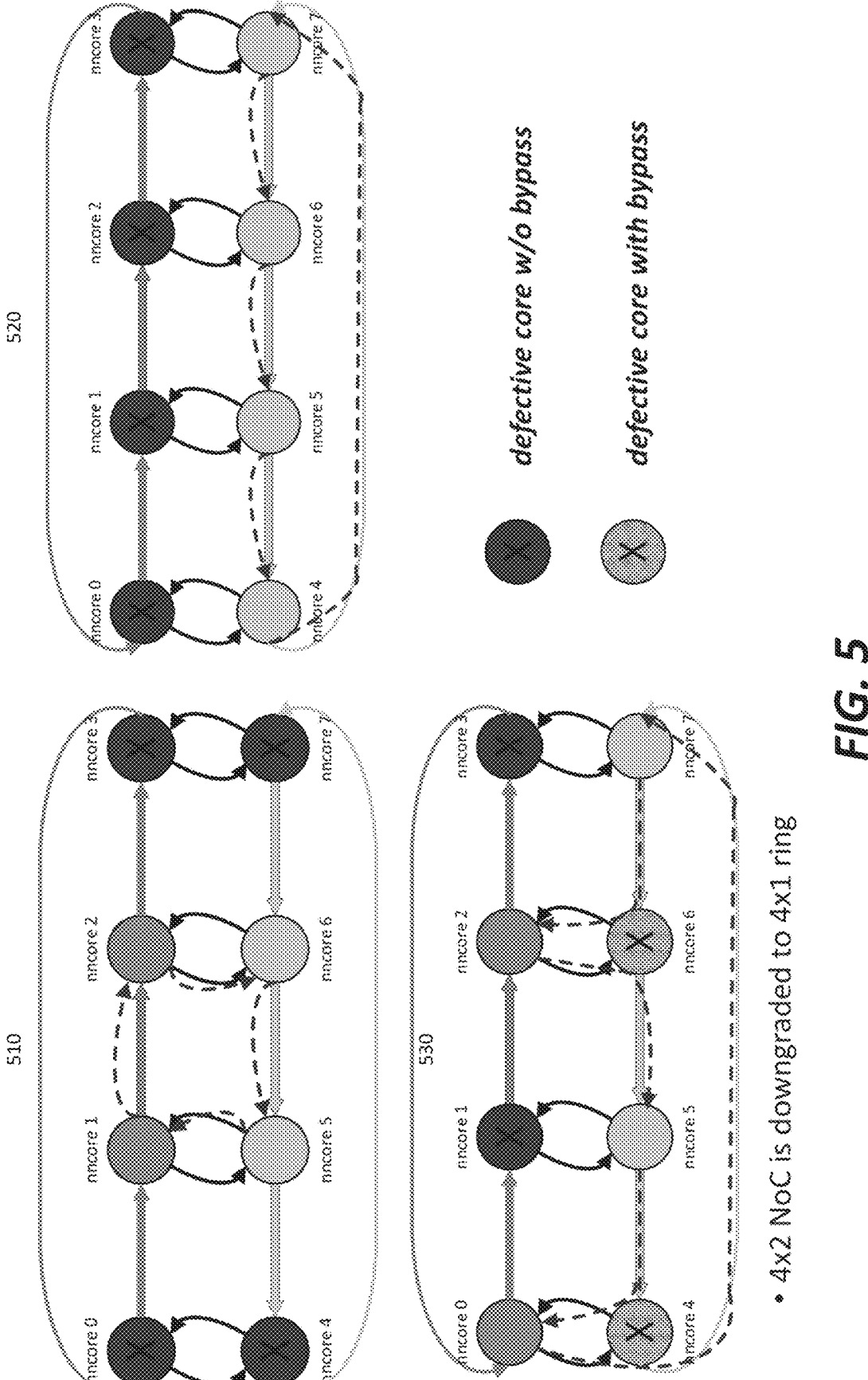
FIG. 5 illustrates exemplary core-level NoC transformations with defective cores, in accordance with various embodiments.

FIG. 5 illustrates exemplary core-level NoC transformations with defective cores, in accordance with various embodiments. The transformation is designed as a fault-tolerant mechanism for the mesh network of data links. The global synchronization switch may have its own fault-tolerant mechanism.

The NoC in FIG. 5 is a 4×2 NoC with 8 cores. A core may become defective in different scenarios. For example, if the core, or more specifically, if the router coupled to the core cannot access its internal buffer (e.g., because of defective ports to the internal buffer or defective internal buffer) but still can perform the routing algorithm, it may be deemed as defective with bypass. As another example, if the router coupled to the core had defective ports to the horizontal or vertical rings, it may be deemed defective without bypass.

In some embodiments, the NoC may be downgraded depending on the number of defective cores and their specific defects. In scenario 510 in FIG. 5, cores 0, 3, 4, and 7 are defective without bypass, the remaining cores may detect the defective neighbors after routing timeout or missed heartbeats. After one core detects that one of its adjacent cores is defective without bypass, it disables the ports corresponding to the adjacent core. For instance, core 5 detects that core 4 is defective without bypass, disables its port for routing data onto the horizontal ring towards core 4, and only leaves its port for the vertical ring towards core 1. After each non-defective core, i.e., cores 1, 2, 5, 6 in FIG. 5, toggles its ports, the 4×2 NoC is downgraded to a 2×2 NoC.

A similar downgrade occurs in the scenario 520 in FIG. 5, in which cores 0, 1, 2, and 3 are defective without bypass, and the remaining cores disable their ports to their respective vertical rings. Thus, the 4×2 NoC is downgraded to a 1×4 NoC.

In the scenario 530 in FIG. 5, cores 1 and 3 are defective without bypass and cores 4 and 6 are defective with bypass. If a non-defective core detects its adjacent core is defective with bypass, it keeps its port to the adjacent core open so that the data can still use the route but simply bypass the adjacent core. As shown, core 5 keeps its port to the horizontal ring (towards core 4) open, core 7 keeps its port to the horizontal ring (towards core 6) open, and the 4×2 NoC is now downgraded to 4×1 NoC.

When the mesh network of the data links downgrades, the global synchronization switch may adjust its bitmap accordingly to mark the defective cores. For instance, if a core becomes defective, the corresponding bit in the bitmap (e.g., bitmap 460 in FIG. 4B) may be unset (e.g., marked as 0) to indicate that the core is not ready to receive control signals. When a sending core tries to send controls signals to the defective core using Send_req command (as shown in FIG. 4B), the global synchronization switch will not return Send_grant back to the sending core or establish the direct core-to-core connection. When the defective core is fixed or replaced, the bitmap in the global synchronization switch may be updated by setting the corresponding bit to allow control signal transmission.

FIG. 6 illustrates an exemplary method 600 of decoupling data and control signal transmissions in a neural network accelerator using a hybrid Network-on-Chip (NoC) architecture, in accordance with various embodiments. In some implementations, one or more process blocks of FIG. 6 may be performed by a Network-on-Chip device.

As shown in FIG. 6, process 600 may include receiving a first request from a receiving core, where: the receiving core is one of the plurality of cores that receives control signals as a part of a neural network task, the neural network task includes transmissions of the control signals and output data from a sending core to the receiving core, and the first request may include a status flag indicating that the receiving core is ready to receive the control signals, and a core identifier of the sending core that is expected to send the control signals (block 610).

For example, Network-on-Chip device may receive a first request from a receiving core, where: the receiving core is one of the plurality of cores that receives control signals as a part of a neural network task, the neural network task includes transmissions of the control signals and output data from a sending core to the receiving core, and the first request may include a status flag indicating that the receiving core is ready to receive the control signals, and a core identifier of the sending core that is expected to send the control signals, as described above.

As also shown in FIG. 6, process 600 may include setting, in a bitmap, a bit corresponding to the receiving core based on the status flag and appending the core identifier of the sending core to a queue associated with the bit (block 620). For example, Network-on-Chip device may set, in a bitmap, a bit corresponding to the receiving core to 1 (indicating the receiving core is ready to receive control signals) and appending the core identifier of the sending core to a queue associated with the bit, as described above.

As further shown in FIG. 6, process 600 may include receiving a second request from the sending core, where the second request may include a core identifier of the receiving core (block 630). For example, Network-on-Chip device may receive a second request from the sending core, where the second request may include a core identifier of the receiving core, as described above.

As also shown in FIG. 6, process 600 may include determining, based on core identifier of the receiving core, that the bit corresponding to the receiving core is set (block 640). For example, Network-on-Chip device may determine, based on core identifier of the receiving core, that the bit corresponding to the receiving core is set, as described above.

As further shown in FIG. 6, process 600 may include determining that the core identifier of the sending core matches any core identifier in the queue associated with the bit (block 650). For example, Network-on-Chip device may determine that the core identifier of the sending core matches any core identifier in the queue associated with the bit, as described above.

As also shown in FIG. 6, process 600 may include establishing a core-to-core connection between the sending core and the receiving core for transmitting the control signals (block 660). For example, Network-on-Chip device may establish a core-to-core direct link between the sending core and the receiving core for transmitting the control signals, as described above.

As further shown in FIG. 6, process 600 may include transmitting the output data of the sending core to the receiving core using the plurality of data links connecting the adjacent cores (block 670). For example, Network-on-Chip device may transmit the output data of the sending core to the receiving core using the plurality of data links connecting the adjacent cores, as described above.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
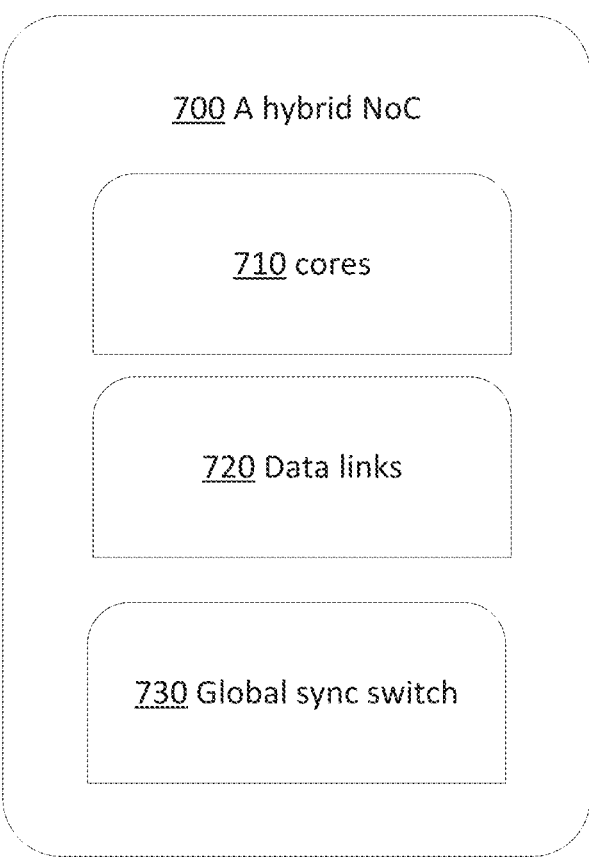
FIG. 7 illustrates an exemplary system design of a hybrid Network-on-Chip (NoC) architecture, in accordance with various embodiments.

FIG. 7 illustrates an exemplary system diagram of a hybrid Network-on-Chip (NoC) architecture 700, in accordance with various embodiments.

As shown, the hybrid NoC 700 may include three main components, a plurality of cores 710, a plurality of data links 720 connecting adjacent cores of the plurality of cores, and a global synchronization switch 730 connected to each of the plurality of cores. The plurality of data links 720 form a mesh topology, and are configured for transmitting data. The global synchronization switch is configured to dynamically establish a connection between any pair of cores in the plurality of cores for transmitting control signals between the pair of cores.

In some embodiments, the plurality of cores 710 are arranged, in a logic view, as a matrix, each row of the matrix comprising a same number of cores; and each row of the plurality of cores are connected in a first uni-directional ring-shape data link and two adjacent first uni-directional ring-shape data links are in opposite directions.

In some embodiments, each column of the plurality of cores 710 are connected in a second uni-directional ring-shape data link and two adjacent second uni-directional ring-shape data links are in opposite directions.

In some embodiments, the plurality of data links 710 each has a higher bandwidth than the connection established in the global synchronization switch.

In some embodiments, the global synchronization switch 730 comprises a bitmap with a plurality of bits respectively corresponding to the plurality of cores. Each bit in the bitmap corresponds to a core and indicates whether the core is ready to receive the control signals. Each bit in the bitmap corresponds to a receiving core and is associated with a queue, wherein the queue is configured to store one or more core identifiers associated with one or more sending cores that are expected to send control signals to the receiving core. A depth of the queue is configured to store two or more core identifiers such that the global synchronization switch allows both multicast in which two or more sending cores transmit control signals to the receiving core.

In some embodiments, the global synchronization switch 730 is configured to: receive a first request from a receiving core, wherein the first request comprises a status flag indicating that the receiving core is ready to receive control signals, and one or more core identifiers of sending cores that are expected to send the control signals; set, in the bitmap, a bit corresponding to the receiving core based on the status flag and append the one or more core identifiers to a queue associated with the bit; receive a second request from a sending core, wherein the second request comprises an identifier of the receiving core; determine that the identifier of the sending core matches one of the one or more core identifiers in the queue associated with the bit corresponding to the receiving core; and establish the core-to-core connection between the sending core and the receiving core for the direct core-to-core transmission of control signals.

In some embodiments, the global synchronization switch 730 is further configured to: in response to the identifier of the sending core matching with one of the one or more core identifiers of cores in the queue, send an acknowledge signal (ACK) to the sending core to commence the transmission of control signals.

In some embodiments, the global synchronization switch 730 is further configured to: concurrently with the sending the ACK to the sending core to commence the transmission of the control signals, clear the identifier of the sending core from the queue, thereby allowing the receiving core to schedule a next control signal transmission.

Figure 8:
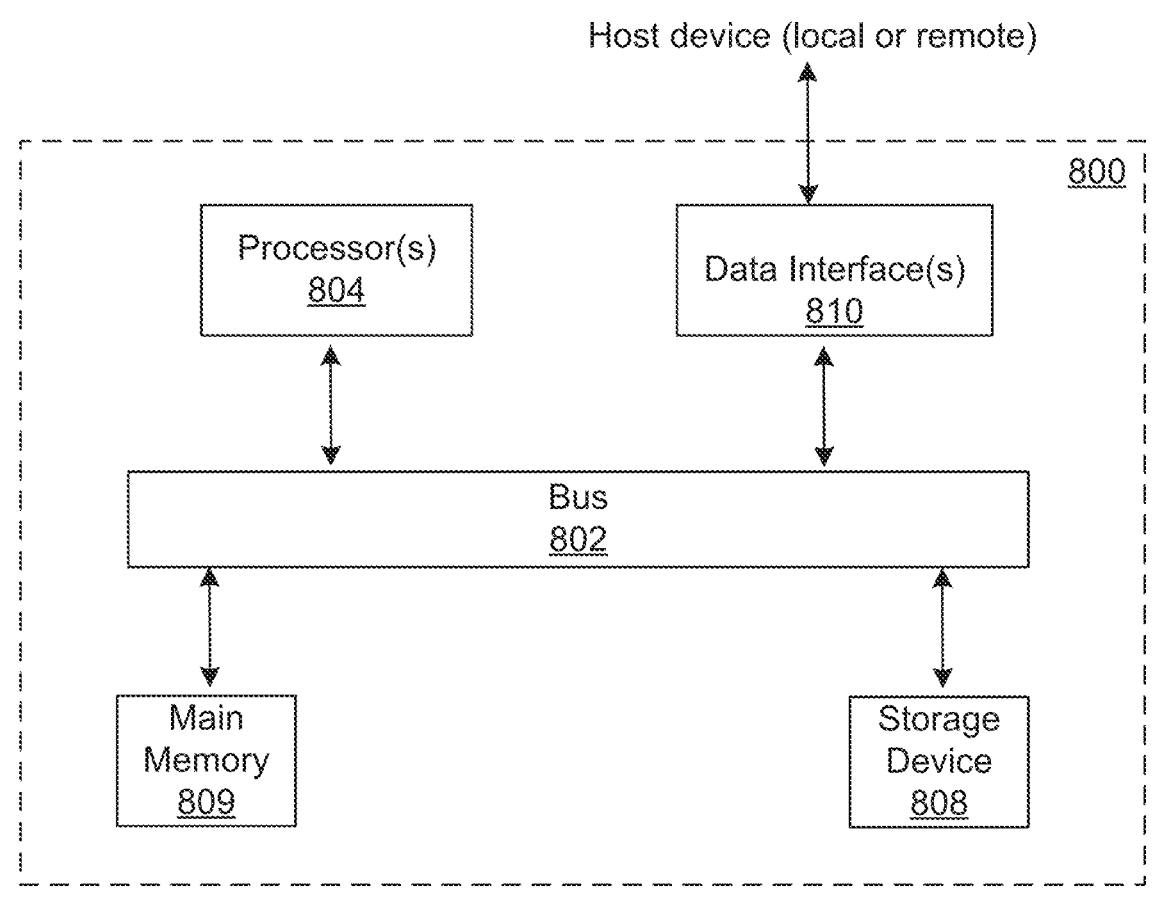
FIG. 8 illustrates an example computer system in which any of the embodiments described herein may be implemented.

FIG. 8 illustrates an example computer system in which any of the embodiments described herein may be implemented. The computing device may be used to implement one or more components of the systems and the methods shown in FIGS. 1-7. The computing device 800 may comprise a bus 802 or other communication mechanisms for communicating information and one or more hardware processors 804 coupled with bus 802 for processing information. Hardware processor(s) 804 may be, for example, one or more general-purpose microprocessors.

The computing device 800 may also include a main memory 809, such as random-access memory (RAM), cache and/or other dynamic storage devices, coupled to bus 802 for storing information and instructions to be executed by processor(s) 804. Main memory 809 also may be used for storing temporary variables or other intermediate information during execution of instructions to be executed by processor(s) 804. Such instructions, when stored in storage media accessible to processor(s) 804, may render computing device 800 into a special-purpose machine that is customized to perform the operations specified in the instructions. Main memory 809 may include non-volatile media and/or volatile media. Non-volatile media may include, for example, optical or magnetic disks. Volatile media may include dynamic memory. Common forms of media may include, for example, a floppy disk, a flexible disk, hard disk, solid-state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, or networked versions of the same.

The computing device 800 may implement the techniques described herein using customized hard-wired logic, one or more ASICs or FPGAs, firmware and/or program logic which in combination with the computing device may cause or program computing device 800 to be a special-purpose machine. According to one embodiment, the techniques herein are performed by computing device 800 in response to processor(s) 804 executing one or more sequences of one or more instructions contained in main memory 809. Such instructions may be read into main memory 809 from another storage medium, such as storage device 808. Execution of the sequences of instructions contained in main memory 809 may cause processor(s) 804 to perform the process steps described herein. For example, the processes/methods disclosed herein may be implemented by computer program instructions stored in main memory 809. When these instructions are executed by processor(s) 804, they may perform the steps as shown in corresponding figures and described above. In alternative embodiments, hard-wired circuit may be used in place of or in combination with software instructions.

The computing device 800 also includes a communication interface 810 coupled to bus 802. Communication interface 810 may provide a two-way data communication coupling to one or more network links that are connected to one or more networks. As another example, communication interface 810 may be a PCIe card to provide a data communication connection to a local host device, or a local area network (LAN) card to provide a data communication connection to a remote host device.

The performance of certain of the operations may be distributed among the processors, not only residing within a single machine, but deployed across a number of machines. In some example embodiments, the processors or processor-implemented engines may be in a single geographic location (e.g., within a home environment, an office environment, or a server farm). In other example embodiments, the processors or processor-implemented engines may be distributed across a number of geographic locations.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuit.

When the functions disclosed herein are implemented in the form of software functional units and sold or used as independent products, they can be stored in a processor executable non-volatile computer-readable storage medium. Particular technical solutions disclosed herein (in whole or in part) or aspects that contribute to current technologies may be embodied in the form of a software product. The software product may be stored in a storage medium, comprising a number of instructions to cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, wherein the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training samples to make a prediction model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context.

Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

The invention claimed is:

1. A Network-on-Chip (NoC), comprising:
a plurality of cores;
a plurality of data links connecting adjacent cores of the plurality of cores and configured to transmit data among the adjacent cores; and
a global synchronization switch connected to each of the plurality of cores, wherein the global synchronization switch is configured to dynamically establish a connection between any pair of cores in the plurality of cores for transmitting control signals between the pair of cores, wherein the global synchronization switch comprises a core-indexed data structure having a plurality of indicators respectively corresponding to the plurality of cores, each indicator corresponding to a receiving core and is associated with a queue, wherein the queue stores one or more core identifiers of one or more sending cores to transmit control signals to the receiving core.

2. The NoC of claim 1, wherein:

the plurality of cores are arranged, in a logic view, as a matrix, each row of the matrix comprising a same number of cores; and each row of the plurality of cores are connected in a first uni-directional ring-shape data link and two adjacent first uni-directional ring-shape data links are in opposite directions.

3. The NoC of claim 2, wherein:

each column of the plurality of cores are connected in a second uni-directional ring-shape data link and two adjacent second uni-directional ring-shape data links are in opposite directions.

4. The NoC of claim 1, wherein:

the plurality of data links each has a higher bandwidth than the connection established by the global synchronization switch.

5. The NoC of claim 1, wherein:

each indicator in the core-indexed data structure corresponds to a core and indicates whether the core is ready to receive a control signal.

6. The NoC of claim 1, wherein:

a depth of the queue is configured to store two or more core identifiers such that the global synchronization switch allows multicast in which two or more sending cores transmit control signals to the receiving core.

7. The NoC of claim 1, wherein the global synchronization switch is configured to:

receive a first request from a receiving core of the plurality of cores, wherein the first request comprises a status flag indicating that the receiving core is ready to receive control signals, and one or more core identifiers of sending cores of the plurality of cores to send the control signals;

set, in a bitmap maintained by the global synchronization switch, a bit corresponding to the receiving core based on the status flag and append the one or more core identifiers to a queue associated with the bit;

receive a second request from a sending core of the plurality of cores, wherein the second request comprises an identifier of the receiving core;

determine that the identifier of the sending core matches one of the one or more core identifiers in the queue associated with the bit corresponding to the receiving core; and establish a connection between the sending core and the receiving core for a direct core-to-core transmission of control signals.

8. The NoC of claim 7, wherein the global synchronization switch is further configured to:

in response to the identifier of the sending core matching with one of the one or more core identifiers of cores in the queue, send an acknowledge signal (ACK) to the sending core to commence a transmission of control signals.

9. The NoC of claim 8, wherein the global synchronization switch is further configured to:

concurrently with the sending the ACK to the sending core to commence the transmission of the control signals, clear the identifier of the sending core from the queue, thereby allowing the receiving core to schedule a next control signal transmission.

10. A global synchronization switch in a Network-On-Chip (NoC) comprising a plurality of cores, wherein the global synchronization switch comprises:

a bitmap comprising a plurality of bits respectively corresponding to the plurality of cores, wherein:

each bit in the bitmap corresponds to a core and indicates whether the core is ready to receive control signals; and each bit in the bitmap is associated with a queue, wherein the queue is configured to store one or more core identifiers associated with one or more sending cores to send control signals to the core;

wherein the global synchronization switch is configured to:

dynamically establish, based on the bitmap, a connection between any pair of cores in the plurality of cores, and the connection connecting the pair of cores forms a direct core-to-core transmission of control signals between the pair of cores.

11. The global synchronization switch of claim 10, wherein the global synchronization switch is connected to each of the plurality of cores in the NoC using an all-to-all topology.

12. The global synchronization switch of claim 10, wherein to dynamically establish the connection between any pair of cores in the plurality of cores, the global synchronization switch is further configured to:

receive a first request from a receiving core, wherein the first request comprises a status flag indicating that the receiving core is ready to receive control signals, and one or more core identifiers of sending cores that are expected to send the control signals;

set, in the bitmap, a bit corresponding to the receiving core based on the status flag and append the one or more core identifiers to a queue associated with the bit;

receive a second request from a sending core, wherein the second request comprises an identifier of the receiving core;

determine that the identifier of the sending core matches one of the one or more core identifiers in the queue associated with the bit corresponding to the receiving core; and establish a connection between the sending core and the receiving core for a direct core-to-core transmission.

13. The global synchronization switch of claim 12, wherein the global synchronization switch is further configured to:

in response to the identifier of the sending core matching with one of the one or more core identifiers of cores in the queue, send an acknowledge signal (ACK) to the sending core to commence the transmission of control signals.

14. The global synchronization switch of claim 13, wherein the global synchronization switch is further configured to:

concurrently with the sending the ACK to the sending core to commence the transmission of the control signals, clear the identifier of the sending core from the queue, thereby allowing the receiving core to schedule a next control signal transmission.

15. The global synchronization switch of claim 13, wherein a depth of the queue is configured to store two or more core identifiers such that the global synchronization switch allows both multicast in which two or more sending cores transmit control signals to the receiving core.

16. A computer-implemented method implemented by a Network-On-Chip (NoC), the NoC comprising a plurality of cores, a plurality of data links connecting adjacent cores of the plurality of cores for transmitting data, and a global synchronization switch connected with each of the plurality of cores for transmitting control signals, the method comprises:

receiving a first request from a receiving core of the plurality of cores, the first request including a status flag indicating that the receiving core is ready to receive control signals, and core identifiers of one or more sending cores of the plurality of cores to send the control signals;

setting, in a bitmap, a bit corresponding to the receiving core and appending the core identifiers of the one or more sending cores to a queue associated with the bit;

receiving a second request from a sending core, wherein the second request comprises a core identifier of the receiving core;

determining, based on the core identifier of the receiving core, that the bit corresponding to the receiving core is set;

determining that the core identifier of the sending core matches a core identifier in the queue associated with the bit;

establishing a core-to-core connection between the sending core and the receiving core for transmitting a control signal; and transmitting data from the sending core to the receiving core using the plurality of data links.

17. The computer-implemented method of claim 16, wherein a depth of the queue is configured to store two or more core identifiers such that the global synchronization switch allows both multicast in which two or more sending cores transmit control signals to the receiving core.

18. The computer-implemented method of claim 16, wherein the establishing the core-to-core connection comprises:

sending an acknowledge signal (ACK) to the sending core to commence the transmission of the control signal; and concurrently with the sending the ACK to the sending core to commence the transmission of the control signal, clearing the core identifier of the sending core from the queue, thereby allowing the receiving core to schedule a next control signal transmission.

* * * * *